US012620046B2

(12) United States Patent
Bleibtrey et al.

(10) Patent No.: US 12,620,046 B2
(45) Date of Patent: May 5, 2026

(54) SYSTEM AND METHOD FOR PROVIDING VEHICLE-BASED SERVICES

(71) Applicant: FETCH.AI Limited, Bury St Edmunds (GB)

(72) Inventors: Devon Bleibtrey, Novi, MI (US); Humayun Sheikh, Bury St Edmunds (GB)

( * ) Notice: Subject to any disclaimer, the term of this patent is extended or adjusted under 35 U.S.C. 154(b) by 578 days.

(21) Appl. No.: 17/829,616

(22) Filed: Jun. 1, 2022

(65) Prior Publication Data

US 2023/0394612 A1 Dec. 7, 2023

(51) Int. Cl.
*G06Q 50/30* (2012.01)
*G06Q 50/40* (2024.01)

(52) U.S. Cl.
CPC .................................... *G06Q 50/40* (2024.01)

(58) Field of Classification Search
CPC ...................................................... G06Q 50/40
See application file for complete search history.

(56) References Cited

U.S. PATENT DOCUMENTS

2015/0227888 A1* 8/2015 Levanon ............ G06Q 10/0834 705/334
2018/0024554 A1* 1/2018 Brady ................ G06Q 10/0833 701/23
2020/0042019 A1* 2/2020 Marczuk ................ G08G 1/202
2020/0234220 A1* 7/2020 Ma ......................... G07C 9/253
2021/0103288 A1* 4/2021 Nemedi ............... G06Q 10/047
2022/0090925 A1* 3/2022 Thompson ......... G01C 21/3617

OTHER PUBLICATIONS

J. Feiler, S. Hoffmann and D. F. Diermeyer, "Concept of a Control Center for an Automated Vehicle Fleet," Dec. 24, 2020, 2020 IEEE 23rd International Conference on Intelligent Transportation Systems (ITSC), pp. 1-6 (Year: 2020).*

* cited by examiner

*Primary Examiner* — Christopher Gomez
(74) *Attorney, Agent, or Firm* — RC Trademark Company

(57) ABSTRACT

Disclosed is a system for providing vehicle-based service(s) mutually interconnected with decentralised network. Decentralised network comprises users and entries of services offered by user(s). System comprises autonomous vehicle agent of first user seeking vehicle-based service(s), and digital representation(s) of second user providing vehicle-based service(s). Autonomous vehicle agent comprises processing module, processing module being configured to: process information pertaining to first user to determine parameters of vehicle-based service(s), search decentralised network to shortlist entries from entries based on parameters of vehicle-based service(s), and perform first vehicle-based action(s) by selecting first entry from shortlisted entries for attaining vehicle-based service(s) for first user.

19 Claims, 6 Drawing Sheets

SYSTEM AND METHOD FOR PROVIDING VEHICLE-BASED SERVICES

TECHNICAL FIELD

This invention relates to autonomous agents. In particular, though not exclusively, this invention relates to a system for providing vehicle-based services using an autonomous agent and a method for providing vehicle-based services using an autonomous agent.

BACKGROUND

With an advent in technology, man has progressed from a wheel to actual vehicles which allow mode of transfer, including, cars, motorbikes, tuk-tuks, buses, trucks, and so forth. In fact, in certain jurisdictions, a vehicle is considered as a basic need, and considered to be essential for human survival. Recently, even autonomous or driverless vehicles have been introduced, which simplify human existence.

However, with increasing population and migration of people to major cities, numbers of vehicles have also exponentially increased. This has led to an increased requirement of vehicle-based services, for example, vehicle cleaning, vehicle re-fueling, vehicle servicing, vehicle towing, and so forth. These services are often not easily attained, and the ones being offered are through service facilitators (or, via centralized marketplaces) which tack on approximately 30% of costs being paid by consumers. Such service facilitators not only empty pockets of the consumers, but also underpay the service providers who are doing actual work for providing services.

Moreover, with respect to vehicle parking services, due to the increase of vehicles on roads surpassing road capacities, nuisance of traffic jams has become a common phenomenon. During recent studies into traffic jams, it was found that on an average, almost 30% vehicles in traffic or congestion are looking for a parking space. These vehicles often worsen the traffic since they move slowly while being on lookout for parking spaces. Moreover, even autonomous or driverless vehicles are not facilitated with finding parking spaces before-hand, and end up contributing to the traffic jam.

Therefore, in light of the foregoing discussion, there exists a need to overcome the aforementioned drawbacks associated with providing vehicle-based services via service facilitators.

SUMMARY OF THE INVENTION

In a first aspect, an embodiment of the present disclosure provides a system for providing vehicle-based services, mutually interconnected with a decentralised network having a plurality of entries of vehicle-based services offered by a plurality of users, the system comprising:

- an autonomous vehicle agent, wherein the at least one autonomous vehicle agent is a digital representation of a first user seeking at least one vehicle-based service; and
- at least one digital representation of a second user providing the at least one vehicle-based service;
- wherein the autonomous vehicle agent comprises a processing module, the processing module being configured to:
  - process information pertaining to at least the first user to determine parameters of the at least one vehicle-based service;

- search the decentralised network to shortlist entries from the plurality of entries, based on the parameters of the at least one vehicle-based service; and
  - perform at least one first vehicle-based action by selecting at least one first entry from the shortlisted entries, for attaining the at least one vehicle-based service for the first user.

It will be appreciated that the system for providing the vehicle-based services facilitates data-based communication between the decentralised network and itself. The system comprises specialized equipment configured to perform specialized tasks for effectively providing the vehicle-based services.

Throughout the present disclosure, the term "decentralised network" refers to a network which facilitates data communication between a plurality of digital nodes. The decentralised network is not governed by a single entity, and therefore does not require any intermediaries for providing or seeking vehicle-based services therewith. Moreover, the decentralised network provides various tools, security protocols, rules and such for the execution of tasks including, but not limited to, communication, processing of information and so forth, between different users associated with the decentralised network. It will be appreciated that the decentralised network may be representative of a real-world environment, such as a real-world market, wherein one or more vehicle-based services are provided and/or procured. The decentralised network is beneficially adaptive in its hardware operation in response to a type of task being processed therethrough. A technical advantage of using the decentralised network is that it eliminates reliability on intermediaries.

Optionally, the decentralised network utilises blockchain technology. The blockchain technology refers to building a digital ledger of information, as a structure which stores records (as blocks), in a network connected via nodes (as chain). It will be appreciated that data of a blockchain is stored chronologically and publicly, in multiple databases and devices, such that it may never be hacked, altered or deleted. A technical advantage of using blockchain technology is to ensure that privacy of users is not compromised, and data cannot be altered.

Optionally, the decentralised network is built using a set of rules which dictate interactions within the decentralised network. Herein, the set of rules block or allow communications between users. Such set of rules are implemented as forms of cooperation between users providing the vehicle-based services and users seeking the vehicle-based services, such that honesty and transparency are maintained therewith. In an example, a rule may be requiring users to undergo a basic verification procedure (such as, an email-based verification, a phone-based verification, an identity-based verification, and so forth) to access the decentralised network. In another example, a rule may be for users to authenticate a smart contract each time an entry of service is selected. It will be appreciated that if these rules are not followed, access would not be granted to the users. A technical advantage of building the decentralised network using the set of rules is that it is robust against third-party attacks, and ensures fairness to both kinds of users-providing the vehicle-based services and seeking the vehicle-based services.

Optionally, a plurality of decentralised networks exist, wherein each decentralised network is mutually interconnected with the system.

Herein, each decentralised network may provide a platform to provide services and/or seek the vehicle-based services of a given type. For example, a first decentralised network may allow the plurality of users to provide and/or seek the vehicle-based services with respect to vehicle parking, a second decentralised network may allow the plurality of users to provide and/or seek the vehicle-based services with respect to vehicle cleaning, a third decentralised network may allow the plurality of users to provide and/or seek the vehicle-based services with respect to vehicle re-filling, and so forth.

The term "plurality of users" refers to users of the decentralised network. Herein, the plurality of users include first users (i.e., users seeking the at least one vehicle-based service) and second users (i.e., users providing the at least one vehicle-based service). It will be appreciated that for each decentralised network, there may be a plurality of first users which are seeking the at least one vehicle-based service and a plurality of second users which are providing the at least one vehicle-based service simultaneously. Moreover, a given second user may provide a plurality of vehicle-based services via the decentralised network, and a given first user may seek a plurality of vehicle-based services via the decentralised network.

The term "plurality of vehicle-based services" refer to the services being provided via the decentralised network. As previously mentioned, such services may be of varied types. Examples of some such services include, but are not limited to, vehicle parking services, vehicle cleaning services, vehicle servicing services, vehicle fuel re-filling services, vehicle transportation services, delivery services to a given vehicle. It will be appreciated that the at least one vehicle-based service is selected from the plurality of vehicle-based services offered by the plurality of users on the decentralised network.

The term "autonomous vehicle agent" refers to a software module that, autonomously, executes one or more technical tasks. It will be appreciated that the autonomous vehicle agent is capable of collecting, mining, harvesting and analysing information in order to make a decision and act upon the same, on behalf of the first user. Moreover, the autonomous vehicle agent comprises at least one computing node (i.e., the processing module). For example, the one or more technical tasks optionally include wired or wireless communication with other entities, processing of information and so forth. In an example, the autonomous vehicle agent employs, when in operation, artificial intelligence (AI) algorithms (namely self-adjusting adaptive algorithms) and machine learning to execute the one or more technical tasks.

Optionally, the autonomous vehicle agent is implemented as a digital twin of the first user. The term "digital twin" refers to a virtual representation of a given user, which is updated in real-life, from real-time data and employs simulation, machine learning and reasoning to assist in decision-making. Typically, the given digital twin spans a lifetime of the given user, however, a lifetime of the given digital twin may vary based on requirements of the given user.

Optionally, the autonomous vehicle agent comprises a digital identity which is a digital representation of a real-world identity of the first user, and wherein the system is configured to allow data communication between the autonomous vehicle agent and the at least one digital representation upon verification of the digital identity of the autonomous vehicle agent by the at least one digital representation. Typically, real-world identities are provided with the unique identity (i.e., ID), which may be a series of numbers, alphabets and/or special characters denoted by an authority to the given user in a real-world environment. Examples of the unique ID include, but are not limited to, a social security number, a passport number, a driving license number and a healthcare record number. Moreover, the digital identity is expressed in form of a series of alphabets, numbers and special characters. Examples of the digital identity include, but are not limited to, a user ID generated by the decentralised network, a name of the user, a username of the user, and a replica of the unique ID of the user. A technical advantage of the autonomous vehicle agent having the digital identity is that it ensures authenticity of the given user on the decentralised network, reducing possibility of cyber-crime.

Optionally, the digital identity of the given user allows an autonomous agent of the given user to interact with autonomous agents of family of the given user. Herein, the term "family" refers to persons that the given user knows in real-life, including their family, their friends, their acquaintances, and so forth. For example, the given autonomous agent of the given user may connect with an autonomous agent of his father, such that both such autonomous agents may share data and find appropriate vehicle-based services to provide. In this example, the autonomous agents may find that the given user and his father are planning a boys road trip in two weeks, and book a vehicle servicing appointment prior to the trip.

The term "service" as used herein refers to an arrangement (namely, "means for") performing an action (namely, an activity) and/or providing assistance for performing such an action. For example, the "service" optionally relates to providing a vehicle parking, providing vehicle transportation services, or vehicle cleaning services.

Optionally, the at least one vehicle-based service is implemented as at least one of: a vehicle parking facility, a vehicle cleaning facility, a vehicle servicing facility, a vehicle fuel re-filling facility, a vehicle transportation facility, a delivery facility to a given vehicle. It will be appreciated that user input is not required for booking and thereafter performing these services, which means that these services are performed autonomously.

A technical advantage of this is that these above-mentioned vehicle-based services being automated saves time of the first user (and in some cases, the second user as well), making life easy for the given user. Moreover, by automating such services, vehicle-based traffic may be reduced in streets, lowering pollution and enabling cities in being smart.

In an example, the first user may require parking spaces every day when she goes to work. Whence normally she would be wasting about 20-30 mins merely looking for a parking space manually, the autonomous vehicle agent of the first user now autonomously selects a suitable parking space for the first user's vehicle, and book the same, such that the first user may park therein every day, saving time and efforts of the first user.

The term "digital representation" refers to a digital profile of a given user. Optionally, a given digital representation is a digital computing node, capable of performing certain tasks in an automated manner. For example, the given digital representation may check for an availability in the given user's calendar before booking a vehicle servicing appointment. Alternatively, optionally, the given digital representation is controlled by the given user. For example, the given user utilises the digital representation to communicate with the plurality of users on the decentralised network. It will be appreciated that the digital representation is capable of performing basic computing tasks based on user authorisation, for providing the at least one vehicle-based service.

Optionally, the at least one digital representation of the second user is implemented as at least one autonomous service agent, wherein the at least one autonomous service agent comprises a digital identity which is a digital representation of a unique identity of the second user, and wherein the system is configured to allow data communication between the autonomous vehicle agent and the at least one autonomous service agent upon mutual verification of the digital identities of the autonomous vehicle agent and the at least one autonomous service agent. The system allows data communication between the autonomous vehicle agent and the at least one autonomous service agent via the decentralised network. Herein, once the data communication is allowed, the digital identities of the first user and the second user must be verified before a data communication channel is installed therein. A technical advantage of the digital representation of the second user being an autonomous agent is that it automates actions of the second user, making it easier for the second user to provide vehicle-based services on the decentralised network. Another technical advantage of this is that it allows the second user to connect with their family as well, and thereon offer customised services. For example, a custom vehicle-painting services provider may be able to connect with members of a motorbike riding group that he may be a part of, such that his autonomous service agent may book appointments with autonomous vehicle agents of the motorbike riding group and custom-paint their motorbikes. Optionally, the autonomous service agent is implemented as a digital twin of the second user.

Optionally, a given autonomous agent is built using information pertaining to a given user, such information being at least one of: information mined from social media networks, information collected via a form, information mined from a user device. Optionally, the information pertaining to users is mined using at least one machine learning mining algorithm. Examples of such information include, but are not limited to, a present location, a plurality of recurrent locations, a like, a dislike, a requirement and a preference. For example, recent and recurrent locations of the given user may be mined to build the autonomous vehicle agent, such that the autonomous vehicle agent may appropriately find parking for the given user whenever the given user goes to work or their favourite restaurant. A technical benefit of building the autonomous agents using such information is that exhaustive and detailed information allows the autonomous agents to identify patterns followed by the users, and thereby predict requirements and make customised decisions for the users. For example, if two users are seeking to get their cars serviced, the autonomous vehicle agents of these users may be able to identify specifications of each of the user's car and book appointments accordingly. In such an example, servicing of one user's electric hatchback would be different than servicing of another user's petrol mini SUV. Herein, the autonomous vehicle agents of the two users would respectively book servicing (i.e., perform the first vehicle-based action, as mentioned below) based on individual cars of the two users.

Herein, information mined from social media networks includes information mined from the given user's social media accounts, along with information from the given user's contacts on such social media networks and activities of the given user on the social media networks. The information collected via the form may be inputted by the given user onto the form itself, often manually. The information mined from the user device includes information mined from saved accounts on the user device, pictures, videos, messages and geolocation positioning system. It will be appreciated that the information mined from social media networks and the information mined from the user device are mined (i.e., extracted) automatically (i.e., without manual requirement), once the given user authorizes the same.

The term "user device" refers to an interactive device, via which the given user is capable of accessing and interacting on the decentralised network. Examples of the user device includes, but is not limited to, a computer, a smartphone, a laptop, a tablet, a smartwatch, and a phablet. For example, the user may use the decentralised network to seek vehicle transportation services using his/her/their smartphone. In this example, the at least one autonomous vehicle agent of the user may be built using the information mined from their smartphone.

Optionally, the information pertaining to the at least one first user is captured using at least one of: a camera, a global positioning system. It will be appreciated that providing/attaining vehicle-based services requires an apt and constantly-updated location of the vehicle of the first user, which can be captured using the global positioning system.

Moreover, the camera assists in providing updates of road circumstances, for example, traffic, congestion, accident, work being done on a road, and so forth. Optionally, the camera is implemented as a plurality of cameras installed throughout a city and/or a camera attached to a remotely-controlled drone. Herein, the camera is capable of providing location information of the vehicle of the first user as well. A technical advantage of information being captured using such devices is that they provide updated real-time information, which is thereby utilised for processing the at least one vehicle-based service.

Optionally, a plurality of autonomous agents are connected via the decentralised network, and wherein information is collected and shared between the plurality of autonomous agents through the decentralised network. Herein, representations of the first users and the second users may be represented as the plurality of autonomous agents. Since a plurality of users can connect via the decentralised network, each user has an autonomous agent associated therewith. It will be appreciated that representations of the first users would be autonomous vehicle agents and representations of the second users would be autonomous service agents. For example, a plurality of autonomous vehicle agents of a plurality of first users and a plurality of autonomous service agents of a plurality of second users may be connected via the decentralised network, wherein the plurality of service agents may provide vehicle parking services around Boston. Herein, the plurality of autonomous service agents may book individual parking spaces from individual autonomous service agents, depending on requirements of the first users.

A technical advantage of having the plurality of autonomous agents connect via the decentralised network is this that it not only allows a wide variety of choice for the first users (seeking the at least one vehicle-based service), but it also allows the second users (providing the at least one vehicle-based service) to have a decent inflow of jobs.

Throughout the present disclosure, the term "processing module" refers to a processing device that performs data processing operations for providing the at least one vehicle-based service to the first user, which is seeking the at least one vehicle-based service via the decentralised network. A given processing module could be external to its corresponding autonomous agent or could be integrated with its corresponding autonomous agent. Moreover, the processing module refers to hardware, software, firmware or a combination of these. It will be appreciated that the processing module of a given autonomous agent performs actions to seek or provide the at least one vehicle-based service thereof.

The processing module of the autonomous vehicle agent of the first user is configured to process the information pertaining to the first user to determine the parameters of the at least one vehicle-based service. Herein, the information pertaining to the first user is mined from various sources as mentioned above. When processed, such information can provide many conclusions since the processing module is capable of identifying patterns and recognising requirements and choices. In a first example, if the first user is fond of cars and maintaining them, and the information pertaining to the first user reveals that the first user was recently in a minor car accident, and if the first user has plans of a road trip after two weeks, the processing module may determine the parameters of the at least one vehicle-based service to get the car fixed while managing required paperwork for insurance.

Optionally, the processing module employs at least one data processing algorithm to process the information pertaining to the first user. Examples of the data processing algorithm includes, but is not limited to, a random walk algorithm, a distributed hash table algorithm, a streaming algorithm, a bulk synchronous processing (BSP) algorithm, and a MapReduce algorithm. Moreover, parameters of the at least one vehicle-based service may be defined as labels which identify the at least one vehicle-based service. Examples of some parameters include, a type of service, a location of service, a date and time of service, and so forth.

Furthermore, the processing module of the autonomous vehicle agent of the first user is configured to search the decentralised network to shortlist entries from the plurality of entries based on the parameters of the at least one vehicle-based service. Optionally, the decentralised network is searched using a searching algorithm. Examples of the searching algorithm include, but are not limited to, a linear search algorithm, a binary search algorithm, a jump search algorithm, an interpolation search algorithm, an exponential search algorithm, a sublist (sub-list) search algorithm, a fibonacci search algorithm, and a ubiquitous binary search algorithm. It will be appreciated that the search is performed for the plurality of entries on the decentralised network. In this regard, the processing module compares each entry from the plurality of entries with respect to the parameters of the at least one vehicle-based service. Entries which qualify each of the parameters of the at least one vehicle-based service during the search are thereafter shortlisted. With respect to the first example, the search may provide a list of mechanics who would fix the car within a fortnight, and accept money from the insurance of the first user.

Thereafter, the processing module of the autonomous vehicle agent of the first user is configured to perform the at least one first vehicle-based action by selecting at least one first entry from the shortlisted entries, for attaining the at least one vehicle-based service for the first user. Herein, the processing module compares the shortlisted entries with respect to their respective advantages and disadvantages and selects the at least one first entry. The parameters of the at least one vehicle-based service dictate the selection or deselection of a given entry. Such deciding factors may be a cost involved, accessibility, a distance from the first user, and so forth. With respect to the first example, an entry having a lowest cost involved, fast delivery, and quality of work would be preferable over all others. Optionally, examples of a given action include sending a signal to the decentralised network regarding a given entry, sending a message to the second user to inquire about the given entry, allowing location-sharing with the second user, and the like. More optionally, examples of the given action include booking a parking space, booking a vehicle cleaning appointment, booking a vehicle servicing appointment, and the like. Notably, herein, "performing the at least one first vehicle-based action" is synonymous with "selection the at least one first entry".

Optionally, the first vehicle-based action is booking a parking space. Optionally, the autonomous vehicle agent performs the at least one first vehicle-based action for a plurality of vehicles. This is applicable when the first user owns a plurality of vehicles and/or when the autonomous vehicle agent of the first user performs the at least one first vehicle-based action for friends and/or family of the first user as well. Alternatively, optionally, a plurality of autonomous vehicle agents perform the at least one first vehicle-based action for a single vehicle. In such a case, the plurality of autonomous vehicle agents may be appointed to the first user, and manage vehicle-based services for the single vehicle owned by the first user. For example, one autonomous vehicle agent may be used to book a parking space for the single vehicle, and another autonomous vehicle agent may be used to book a cleaning service for the single vehicle.

It will be appreciated that the system of the present disclosure beneficially provides the decentralised network, wherein the plurality of users provide and/or seek the at least one vehicle-based service. Herein, since the network is decentralised, it eliminates a need of middlemen, allowing service providers (i.e., the second user) and service seekers (i.e., the first user) to connect directly. Additionally, the autonomous vehicle agent of the first user facilitates selection and finalization of service providers autonomously, which saves time and allows the plurality of users to focus on their passions and lives instead of constantly searching for services or customers.

Moreover, the processing module is optionally configured to perform a plurality of first vehicle-based actions with respect to the at least one first entry. With respect to the above example, a first vehicle-based action is selecting a mechanic for repairing the car. Another first vehicle-based action may be entering into a smart contract with the mechanic. Yet another first vehicle-based action may be putting a token amount as per a quote given by the mechanic into escrow, which would be transferred to the mechanic once the car is repaired and delivered back to the first user.

Optionally, when performing the at least one first vehicle-based action, the processing module is configured to perform intermediate steps related to availing the at least one vehicle-based service for the first user. Herein, such intermediate steps include, but are not limited to, running a credit check for the given user, performing security verification of payment information, verifying a digital signature in the smart contract, and providing a review of the at least one vehicle-based service availed. Notably, if the at least one vehicle-based service is not performed appropriately, alternate possibilities may ensue depending on the smart contract, which may provide compensation (i.e., in cash, kind, and the like) to the first user. For example, if the given user had a car repairing booking wherein decided parts of the car were not repaired, the given user may be liable for compensation and/or the repair work being appropriately done.

Optionally, the given autonomous agent receives at least one user authorisation from the given user via the user device, and wherein the at least one user authorisation is of at least one form of: a verbal authorisation, a written authorisation, a haptic authorisation, a pre-determined custom authorisation. Herein, the term "user authorisation" refers to a permission from the given user to allow the given autonomous agents to make decisions on their behalf. Such user authorisation may be a prior authorisation provided to the given autonomous agent. It will be appreciated that such user authorisation may be renewed at periodic intervals. Such periodic intervals may be weekly, monthly, yearly, and so forth. Moreover, such user authorisation may be direct or indirect. In an example, the given user may authorize the autonomous agent to find him a parking space by selecting such a written option on the decentralised network. In another example, the given user may authorize the autonomous agent to find him a parking space every morning he touches a portion of his mirror.

It will be appreciated that the direct authorisation involves the given user to specifically provide authorisation for a specific task or group of tasks (which may have to be performed one or more times), whereas the indirect authorisation involves the user providing authorisation for vehicle-based services with or without specifying a type, time, date or more of the service. Notably, any form of the at least one user authorisation may be provided as either the direct authorisation or the indirect authorisation. Optionally, the at least one user authorisation is revocable by the given user.

The verbal authorisation requires the given user to verbally permit the given autonomous agent to perform at least one action. Herein, the given user may verbally state such a request or select such authorisation from a plurality of possible verbal requests. The written authorisation requires the given user to permit the given autonomous agent by providing a hand-written authorisation (in a natural language), providing a textual authorisation, selecting a textual authorisation from a plurality of possible written authorizations. The haptic authorisation may be provided by way of vibrations, wherein either the given user moves the user device to activate the haptic authorisation, or select from a plurality of haptic responses. The pre-determined custom authorisation refers to a conditional authorisation, and requires the given user to initially set the pre-determined custom authorisation and inform the same to the decentralised network. For example, a pre-determined custom authorisation may be to book a parking space near a place of work of the given user, when the given user removes a tie from drawers. Herein, opening the drawers and taking out a tie is the pre-determined custom authorisation which thereby grants permission to the given autonomous agent to book the parking space. A technical advantage of receiving the user authorisation from the given user is that it ensures security protocol and establishes the kind of services the given user wishes to seek.

Optionally, the autonomous vehicle agent of the first user performs at least one second vehicle-based action by selecting at least one second entry for attaining at least one another vehicle-based service. It will be appreciated that the autonomous vehicle agent also identifies, and avails additional services related to the at least one vehicle-based service that the first user may require. Herein, the processing module is configured to perform the at least one second vehicle-based action by selecting at least one second entry for attaining at least one another vehicle-based service. With respect to the first example, a second vehicle-based action may be having gas in the car re-filled while the car is getting repaired at the mechanic. Another second vehicle-based action may be having dry-cleaned clothes for the trip delivered to the car while the car is parked with the mechanic. Optionally, the autonomous vehicle agent of the first user performs a plurality of actions by selecting a plurality of entries for attaining a plurality of vehicle-based services for the first user. A technical advantage of the autonomous vehicle agent performing the at least one second vehicle-based action is that it dynamically identifies similar requirements and ensures that tasks are performed autonomously, allowing the first user to focus on their passions and family without having stress regarding other miscellaneous activities they ought to do. Another technical advantage of this is that it ensures that all related services are availed at once, providing robustness and accessibility.

Optionally, the at least one decentralised network is configured to employ adaptive data encryption and data obfuscation processing operations depending upon one or more parameters of a given vehicle-based service, to provide a degree of data protection. The adaptive data encryption and data obfuscation advantageously make the decentralised network robust, and prevent it from unwanted intrusions, for example third-part malicious attacks. Moreover, adaptive data encryption employed by the given autonomous agent encrypts the data being exchanged based on the type of data.

Optionally, when the at least one decentralised network is in operation, the adaptive data encryption and data obfuscation processing operations are selected depending upon at least one of: a temporal rate of execution of services via a given node of the at least one decentralised network, considerations associated with vehicle-based services being executed via a given node of the at least one decentralised network. It will be appreciated that combinations of obfuscation, for example swapping of nibbles of bytes, and encryption (likewise, corresponding de-obfuscation and decryption) are capable of approaching a "one time pad" degree of data protection which can only be attacked by using extreme amounts of data processing resources that would not normally be available to malicious third parties.

Optionally, the adaptive data encryption and data obfuscation processing operations comprise a combination of following data protection processes: encryption, decryption, data obfuscation by swapping one or more bits of data bytes, addition of obfuscating redundant data ("data decoys"), temporally randomised transmission times for data within the at least one decentralised network. A technical advantage of utilising the above-mentioned data protection processes is that it allows security against hackers and threats, and ensures data privacy and security.

In a second aspect, an embodiment of the present disclosure provides a method for providing vehicle-based services, the method comprising:

- building the at least one decentralised network having a plurality of entries of services offered by a plurality of second users;
- building an autonomous vehicle agent, wherein the autonomous vehicle agent is a digital representation of a first user seeking at least one vehicle-based service;
- building at least one digital representation of a second user providing the at least one vehicle-based service;
- processing information pertaining to at least the first user to determine parameters of the at least one vehicle-based service;
- searching the at least one decentralised network to short-list entries from the plurality of entries, based on the parameters of the at least one vehicle-based service; and
- performing at least one first vehicle-based action by the autonomous vehicle agent selecting at least one first entry from the shortlisted entries, for attaining the at least one vehicle-based service for the at least one first user.

Optionally, when building a given decentralised network, the method comprises using at least a set of rules which dictate interactions within the given decentralised network.

Optionally, the information pertaining to the at least one first user is captured using at least one of: a camera, a global positioning system.

Optionally, the method further comprises performing at least one second vehicle-based action by selecting at least one second entry for attaining at least one another vehicle-based service.

Optionally, the given autonomous agent comprises a digital identity which is a digital representation of a real-world identity of the given user, and wherein the method further comprises allowing data communication between the autonomous vehicle agent and the at least one digital representation upon verification of the digital identity of the autonomous vehicle agent by the at least one digital representation.

Optionally, the at least one digital representation of the second user is implemented as at least one autonomous service agent, wherein the at least one autonomous service agent comprises a digital identity which is a digital representation of a unique identity of the second user, and wherein the method further comprises allowing data communication between the autonomous vehicle agent and the at least one autonomous service agent upon mutual verification of the digital identities of the autonomous vehicle agent and the at least one autonomous service agent.

Optionally, when building a given autonomous agent, the method comprises using information pertaining to a given user, such information being at least one of: information mined from social media networks, information collected via a form, information mined from a user device.

Optionally, a plurality of autonomous agents are connected via the decentralised network, and wherein information is collected and shared between the plurality of autonomous agents through the decentralised network.

Optionally, the at least one vehicle-based service is implemented as at least one of: a vehicle parking facility, a vehicle cleaning facility, a vehicle servicing facility, a vehicle refilling facility, a vehicle transportation facility, a delivery facility to a given vehicle.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the following diagrams wherein.

DETAILED DESCRIPTION OF THE DRAWINGS

Figure 1:
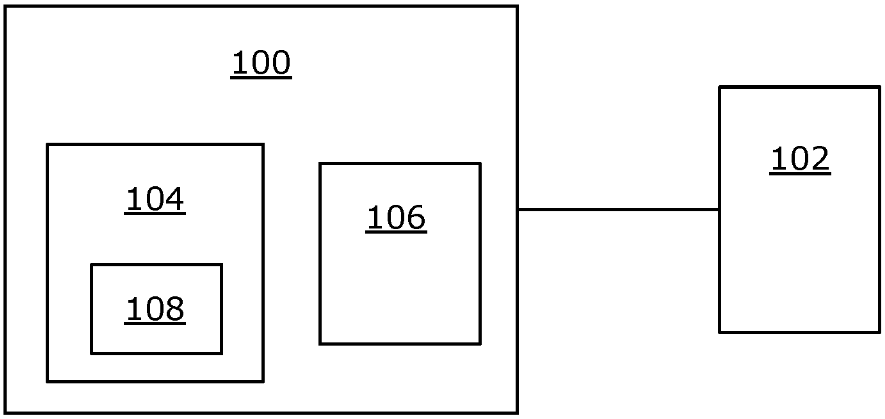
FIG. 1 is a block diagram representing a system for providing vehicle-based services, in accordance with an embodiment of the present disclosure.

Referring to FIG. 1, illustrated is a block diagram representing a system 100 for providing vehicle-based services, in accordance with an embodiment of the present disclosure. The system 100 is mutually interconnected with a decentralised network 102. The system 100 comprises an autonomous vehicle agent 104 of a first user seeking the at least one vehicle-based service, and at least one digital representation (depicted as a digital representation 106) of a second user providing the at least one vehicle-based service. Furthermore, the autonomous vehicle agent 104 of the first user comprises a processing module 108.

Figure 2:
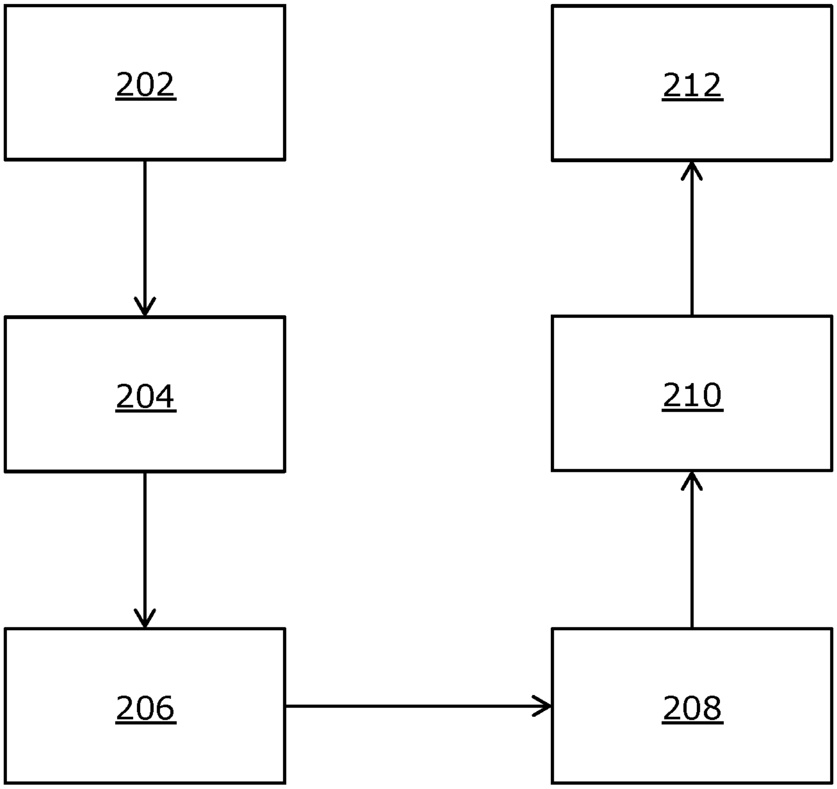
FIG. 2 is a process flow depicting steps of a method for providing vehicle-based services, in accordance with an embodiment of the present disclosure.

Referring to FIG. 2, illustrated is a process flow depicting steps of a method for providing vehicle-based services, in accordance with an embodiment of the present disclosure. At 202, a decentralised network is built, wherein the decentralised network comprises a plurality of users and a plurality of entries of services offered by a plurality of second users. At 204, an autonomous vehicle agent is built, wherein the autonomous vehicle agent is a digital representation of a first user seeking at least one vehicle-based service. At 206, at least one digital representation of a second user providing the at least one vehicle-based service is built. At 208, information pertaining to at least the first user is processed to determine parameters of the at least one vehicle-based service. At 210, the decentralised network is searched to shortlist entries from the plurality of entries, based on the parameters of the at least one vehicle-based service. At 212, at least one first vehicle-based action is performed by the autonomous vehicle agent selecting at least one first entry from the shortlisted entries, for attaining the at least one vehicle-based service for the first user.

The aforementioned steps are only illustrative and other alternatives can also be provided where one or more steps are added, one or more steps are removed, or one or more steps are provided in a different sequence without departing from the scope of the claims herein.

Figure 3:
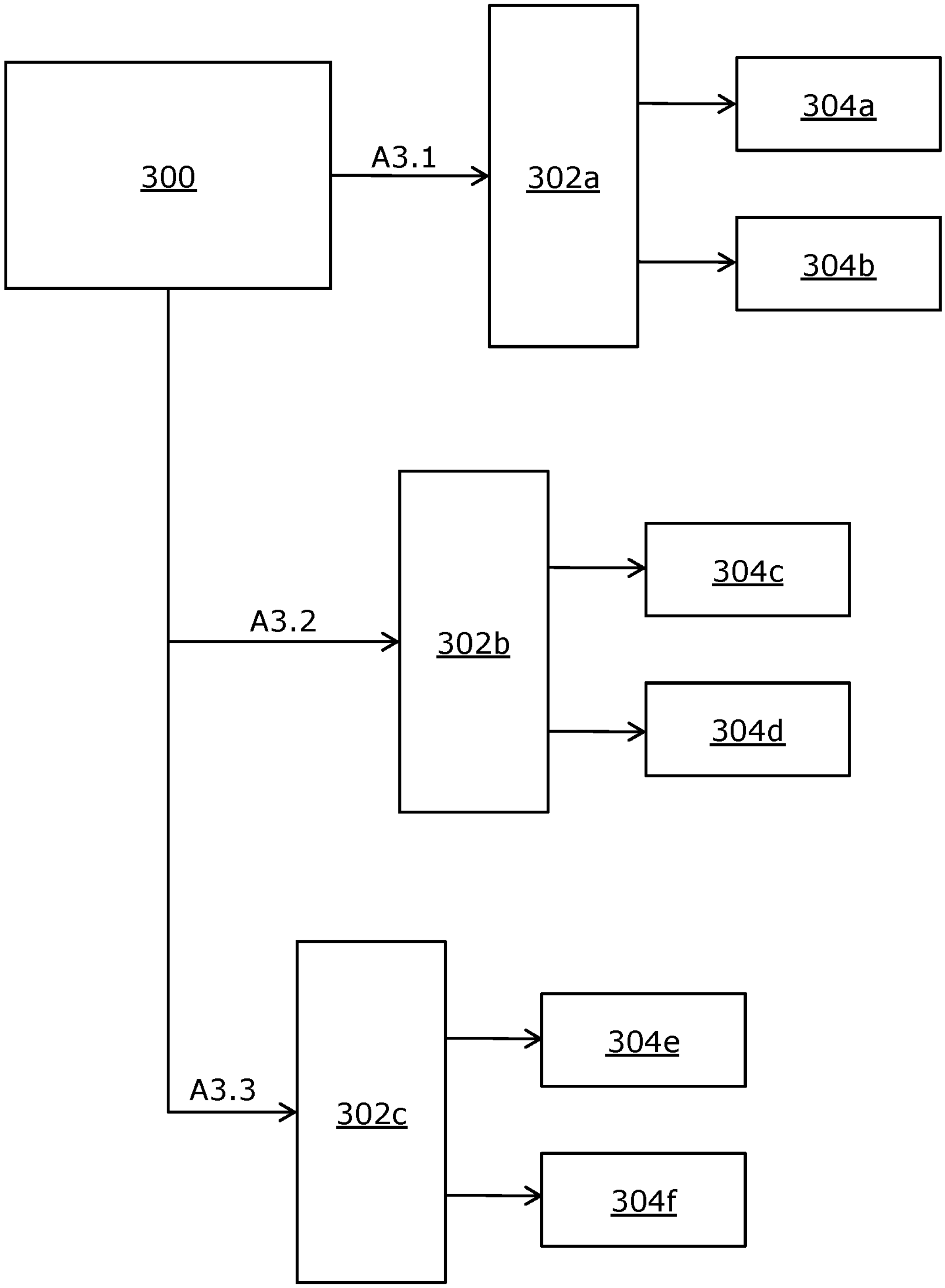
FIG. 3 is an exemplary process flow depicting vehicle-based actions being performed by a processing module of an autonomous vehicle agent of a first user, in accordance with an embodiment of the present disclosure.

Referring to FIG. 3, illustrated is an exemplary process flow depicting vehicle-based actions being performed by a processing module 300 of an autonomous vehicle agent of a first user, in accordance with an embodiment of the present disclosure. Firstly, the processing module 300 performs a first vehicle-based action A3.1 at a first decentralised network 302*a*, wherein services are provided by a first digital representation 304*a* and a second digital representation 304*b*. Secondly, the processing module 300 performs a second vehicle-based action A3.2 at a second decentralised network 302*b*, wherein services are provided by a third digital representation 304*c* and a fourth digital representation 304*d*. Lastly, the processing module 300 performs a third vehicle-based action A3.3 at a third decentralised network 302*c*, wherein services are provided by a fifth digital representation 304*e* and a sixth digital representation 304*f*. For example, the processing module 300 of the autonomous vehicle agent is searching for motorcycle-related services. In this example, the processing module may perform the first vehicle-based action A3.1 as finding a mechanic for motorcycle servicing at a motorcycle servicing network 302*a*, the second vehicle-based action A3.2 as motorcycle cleaning at a motorcycle cleaning network 302*b*, and the third vehicle-based action A3.3 as a fuel delivery at a fuel delivery network 302*c*.

FIG. 3 is merely an example, which should not unduly limit the scope of the claims herein. A person skilled in the art will recognize many variations, alternatives, and modifications of embodiments of the present disclosure.

FIGS. 4-9 illustrate various exemplary scenarios for which the system for providing vehicle-based services can be utilized. Herein, an autonomous vehicle agent (specifically, the processing module of the autonomous vehicle agent) searches for vehicle-based services on a decentralized network and performs a first vehicle-based action by selecting at least one first entry to attain the at least one vehicle-based service for the first user. It will be appreciated that a manner of performing these various services may be different, along with information being utilized for each service.

Figure 4:
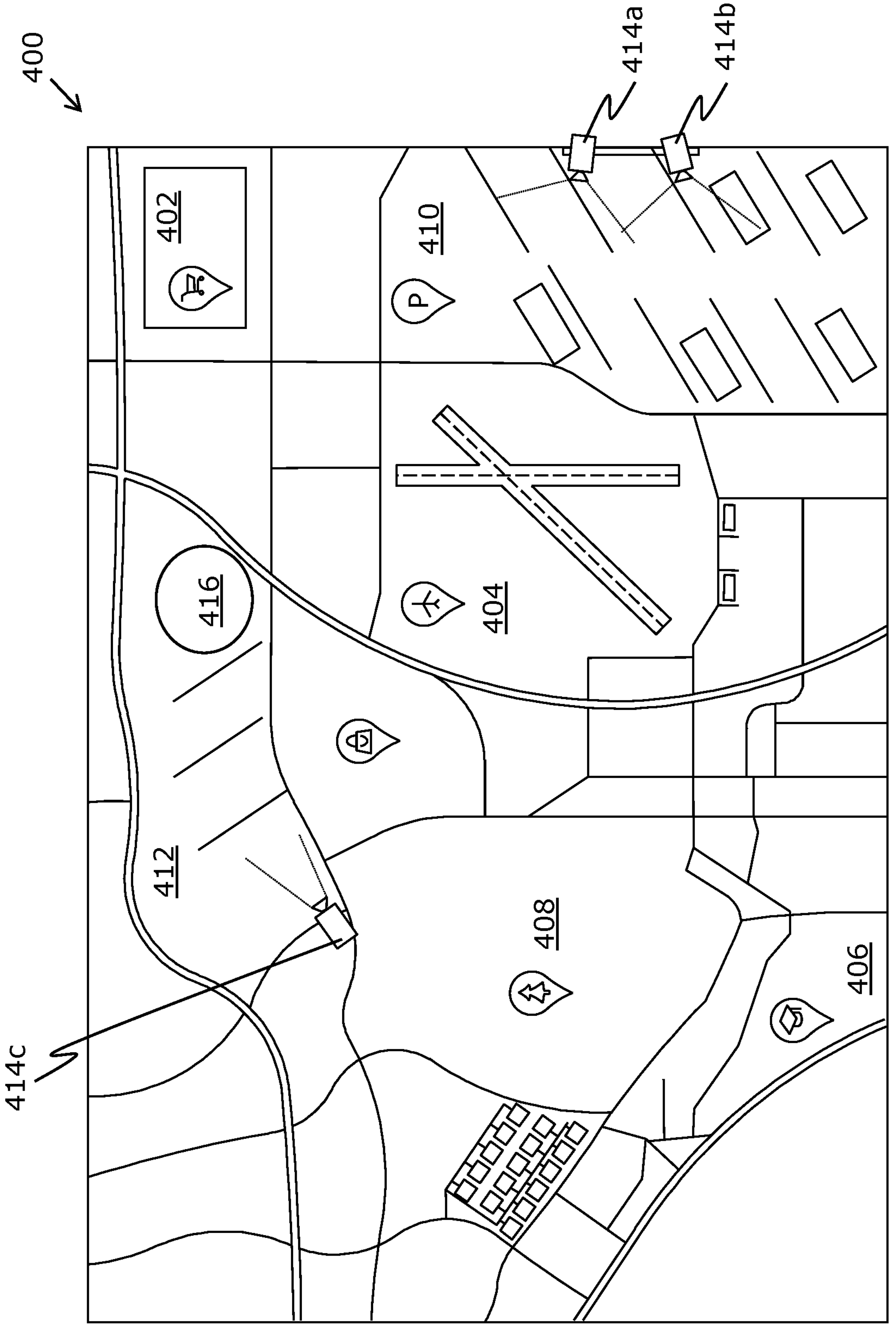
FIG. 4 is an exemplary implementation of vehicle parking facility, in accordance with an embodiment of the present disclosure.

Referring to FIG. 4, illustrated is an exemplary implementation of vehicle parking facility, in accordance with an embodiment of the present disclosure. On a map 400 of a city, multiple locations are visible where a first user may travel, such as, a shopping complex 402, an airport 404, a school 406, a garden 408, and parking lots 410 and 412. Herein, an autonomous vehicle agent may utilise street cameras 414*a*, 414*b* and 414*c* to check for available parking spaces. If a first user has to visit the garden 408, the autonomous vehicle agent may book a parking spot 416 for a vehicle of the first user.

Figure 5:
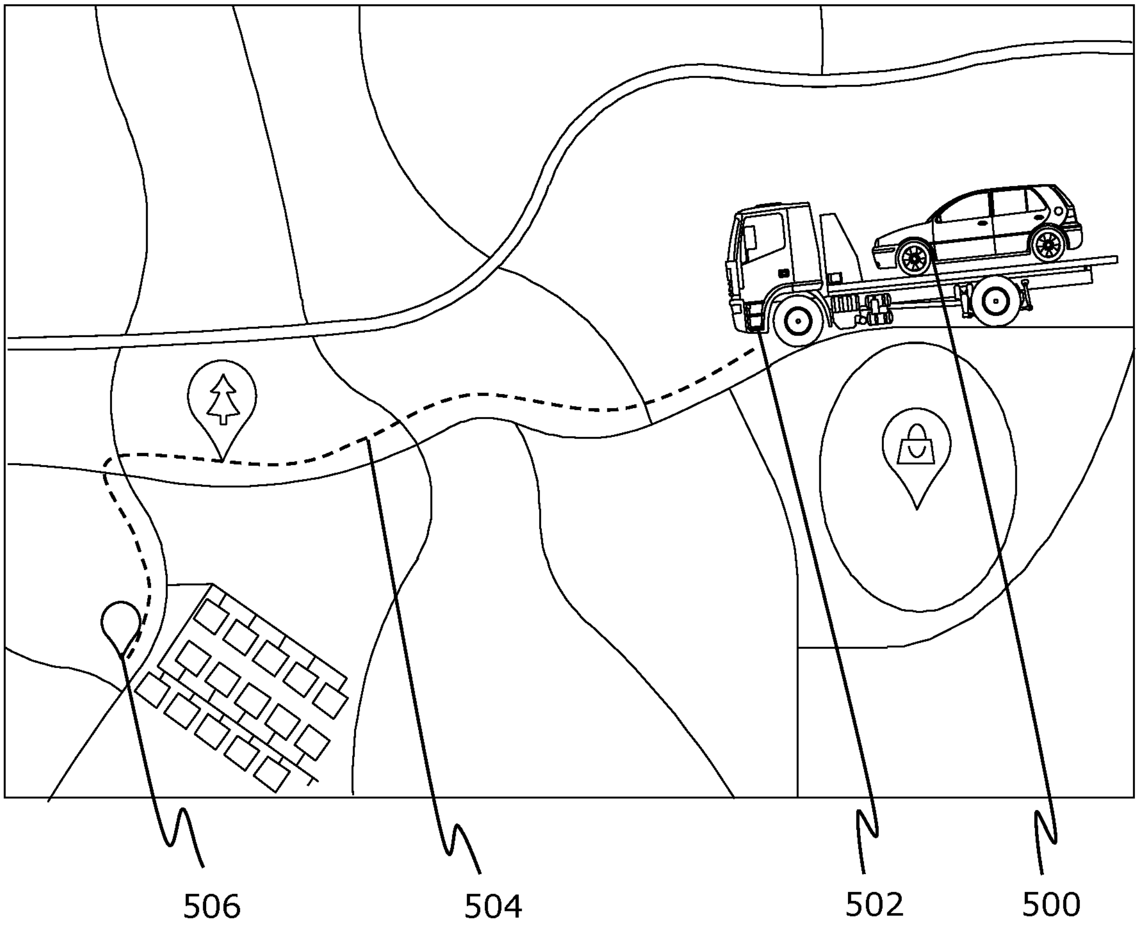
FIG. 5 is an exemplary implementation of vehicle transportation facility, in accordance with an embodiment of the present disclosure.

Referring to FIG. 5, illustrated is an exemplary implementation of vehicle transportation facility, in accordance with an embodiment of the present disclosure. Herein, a car 500 of a first user is required to be transported, so an autonomous vehicle agent utilises a global positioning system of the car 500 to identify its geographical location. The autonomous vehicle agent books a transportation facility and shares the geographical location of the car 500 with a towing truck 502. A global positioning system of the towing truck 502 is utilised to track a path 504 taken by the towing truck 502 to reach a destination 506.

Figure 6:
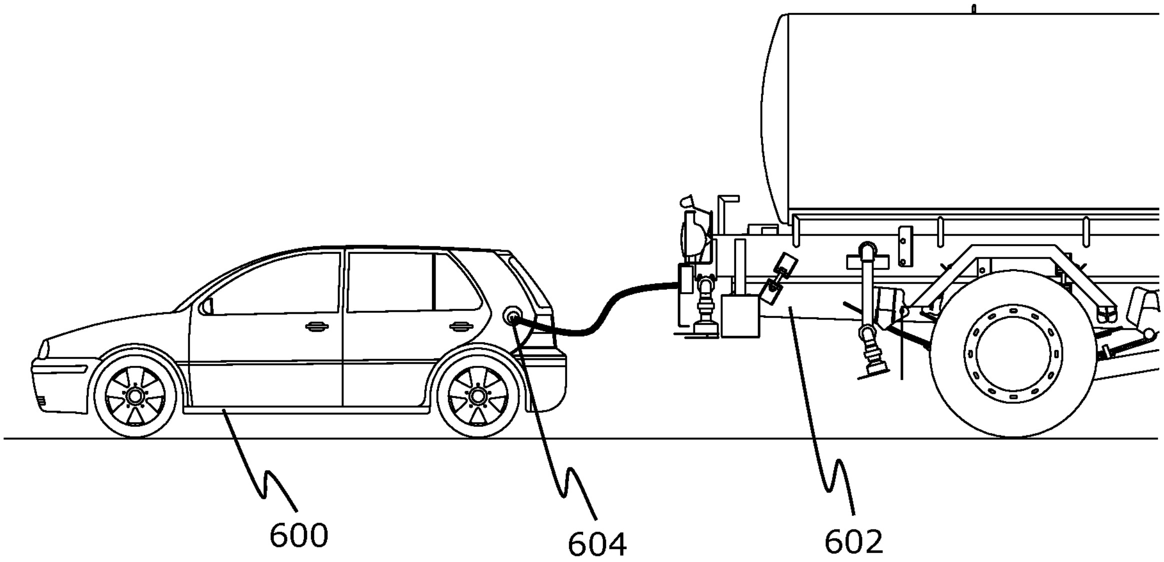
FIG. 6 is an exemplary implementation of vehicle refueling facility, in accordance with an embodiment of the present disclosure.

Referring to FIG. 6, illustrated is an exemplary implementation of vehicle re-fueling facility, in accordance with an embodiment of the present disclosure. A car 600 of a first user is re-fueled while being parked at a parking lot. Herein, an autonomous vehicle agent of the first user books a vehicle re-fueling service for the car 600 of the first user. When a re-fueling truck 602 arrives, the autonomous vehicle agent autonomously opens a lid 604 of a fuel tank of the car 600, such that the car 600 may be re-fueled.

Figure 7A:
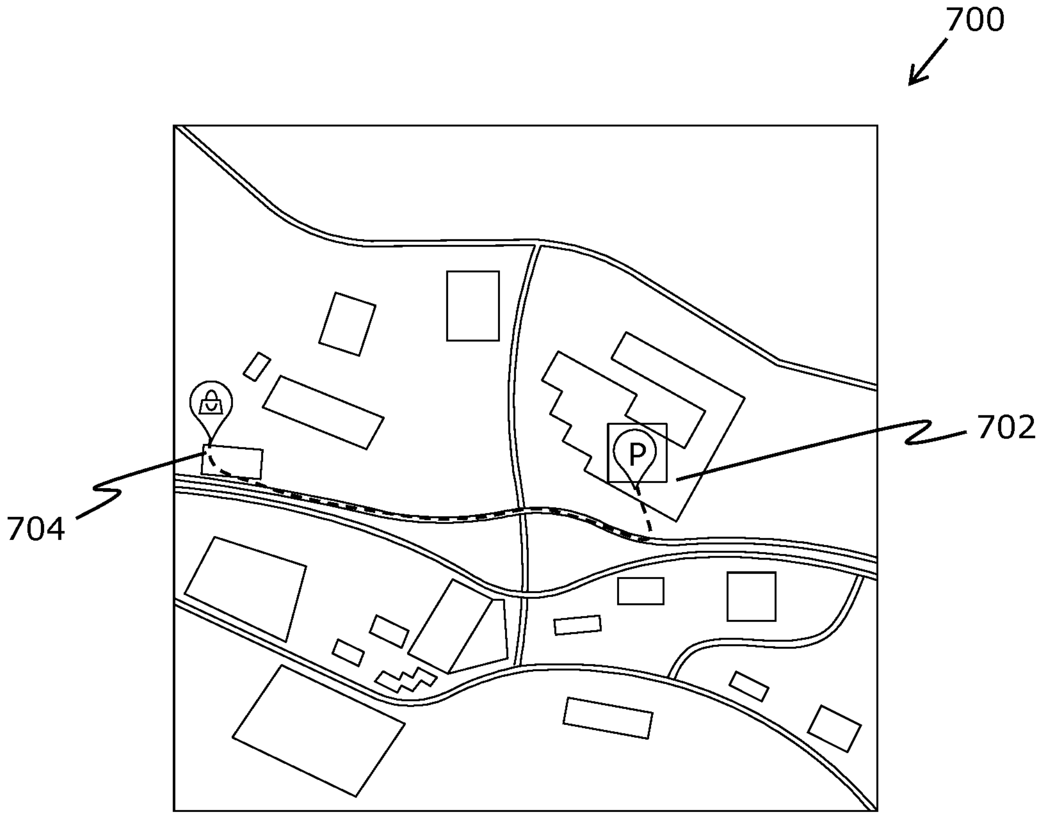
FIG. 7 is an exemplary implementation of delivery facility to a vehicle, in accordance with an embodiment of the present disclosure.
Figure 7B:
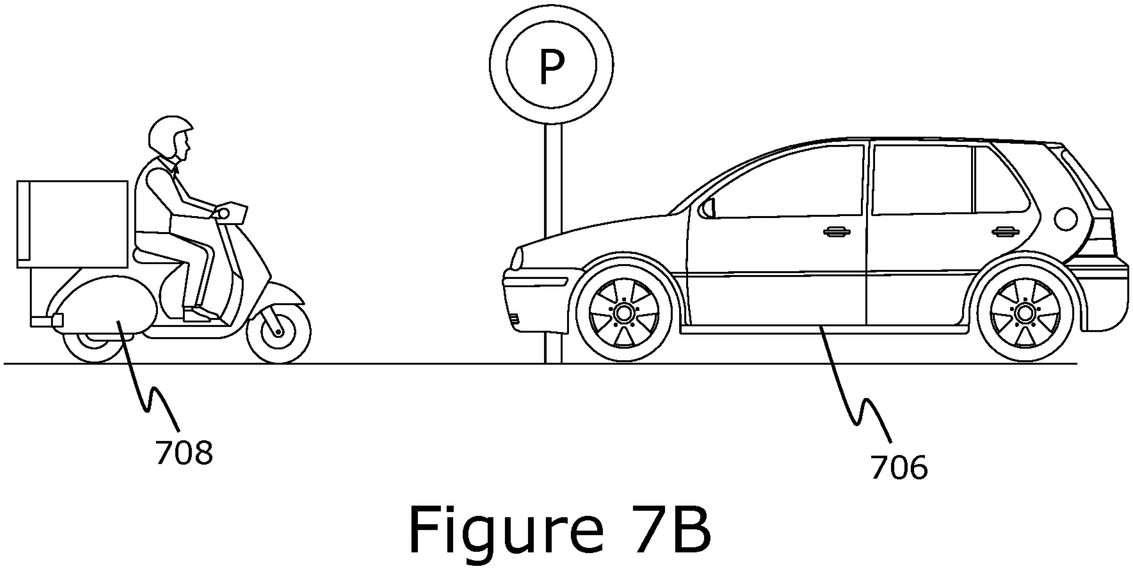

Referring to FIG. 7, illustrated is an exemplary implementation of delivery facility to a vehicle, in accordance with an embodiment of the present disclosure. FIG. 7A illustrates a map 700 of a city wherein the delivery facility is attained, and FIG. 7B illustrates a close-up of the vehicle where delivery is attained. Herein, the vehicle (implemented as a car 706) is parked at a parking lot 702. An autonomous vehicle agent of the first user books a delivery to the car 706, and shares a location of the car 706 with a digital representation of a second user. The digital representation thereon dispatches a delivery agent 708 which collects deliverables from a supermarket 704 and delivers them to the car 706. The autonomous vehicle agent autonomously unlocks the car 706 to allow the delivery agent 708 to place the deliverables in the car 706.

Figure 8:
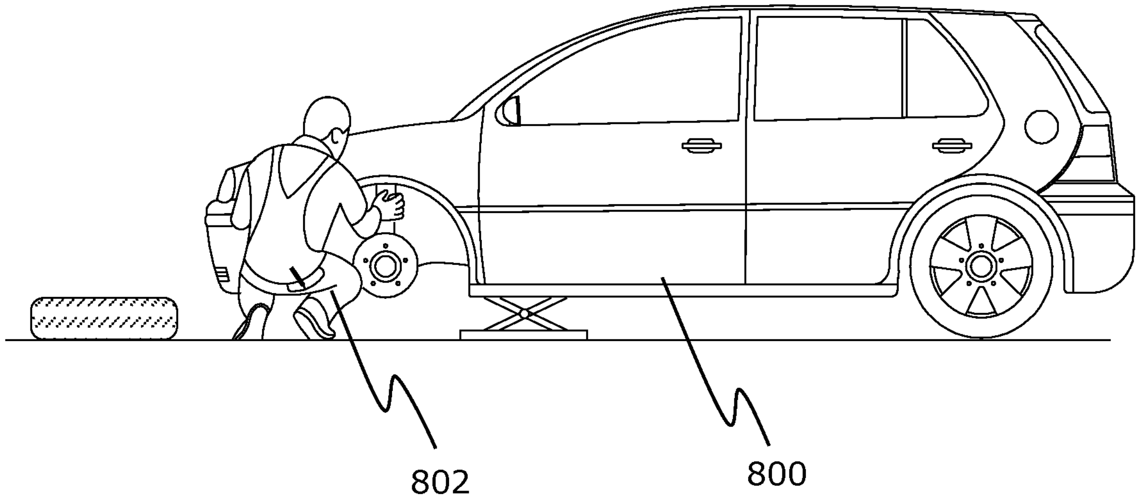
FIG. 8 is an exemplary implementation of vehicle servicing facility, in accordance with an embodiment of the present disclosure.

Referring to FIG. 8, illustrated is an exemplary implementation of vehicle servicing facility, in accordance with an embodiment of the present disclosure. An autonomous vehicle agent of the first user may book a vehicle servicing appointment for a car 800 of the first user, and share a location of the car 800 with a mechanic 802. Thereafter, the mechanic 802 services the car 800 at the location itself. The autonomous vehicle agent autonomously opens the car 800 to allow access to the mechanic 802 for servicing.

Figure 9:
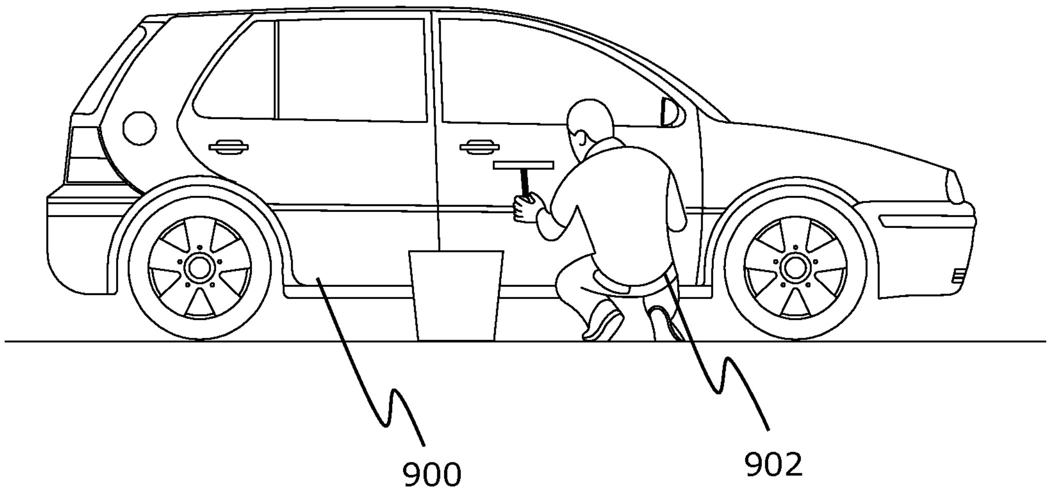
FIG. 9 is an exemplary implementation of vehicle cleaning facility, in accordance with an embodiment of the present disclosure.

Referring to FIG. 9, illustrated is an exemplary implementation of vehicle cleaning facility, in accordance with an embodiment of the present disclosure. An autonomous vehicle agent of the first user may book a vehicle cleaning appointment for a car 900 of the first user, and share a location of the car 900 with a vehicle cleaner 902. Thereafter, the vehicle cleaner 902 cleans the car 900 at the location itself. The autonomous vehicle agent autonomously opens the car 900 to allow access to the vehicle cleaner 902 for cleaning.

FIGS. 4-9 are merely examples, which should not unduly limit the scope of the claims herein. A person skilled in the art will recognize many variations, alternatives, and modifications of embodiments of the present disclosure.

What is claimed is:

1. A system for providing at least one vehicle-based service, the system comprising:

an autonomous vehicle agent, wherein the autonomous vehicle agent is a software module that is a digital twin of a first user seeking the at least one vehicle-based service, the digital twin being generated from first-user data obtained, upon authorization, from at least one user-associated device, the user-associated device comprising at least one of: a user device, a camera, and a global positioning system; and an autonomous service agent, wherein the autonomous service agent comprises a software module that is a digital twin of a second user configured to provide the at least one vehicle-based service, the digital twin being generated from service-provider data of the second user stored in a plurality of entries corresponding to a plurality of vehicle-based services, wherein the autonomous vehicle agent, the autonomous service agent, and a plurality of users comprising a plurality of first users and a plurality of second users are communicably coupled to a decentralized network, the decentralized network comprising a plurality of nodes storing the plurality of entries corresponding to the plurality of vehicle-based services;

wherein the autonomous vehicle agent comprises at least one hardware processing module operatively coupled to the decentralized network and to the at least one user-associated device, wherein the at least one hardware processing module is configured to:

identify, using a machine-learning mining algorithm, the first-user data from the at least one user-associated device, wherein the first-user data comprises at least one of: a present location, recurrent locations, a preference, a requirement, and a like or dislike;

execute a data-processing algorithm to extract service parameters of the at least one vehicle-based service from the first-user data, the service parameters comprising at least a service type and a service location, the service location being identifiable from at least one of: the camera and the global positioning system;

execute a search algorithm to search over the decentralized network to identify the plurality of entries that correspond to the service parameters;

compare the identified plurality of entries corresponding to the service parameters using one or more decision factors of the at least one vehicle-based service for the first user, the one or more decision factors comprising at least one of: cost, accessibility, distance, and historical quality;

select at least one first entry from the identified plurality of entries that satisfies the one or more decision factors;

transmit, over the decentralized network, data corresponding to the selected first entry to the autonomous service agent, the transmitted data being operative to initiate execution of at least one service-based action by the autonomous service agent; and transmit, over the decentralized network, data comprising control instructions corresponding to the selected first entry, the control instructions being executable by the autonomous vehicle agent to perform at least one vehicle-based action comprising at least one of: transmitting vehicle-location data and unlocking the vehicle.

2. The system of claim 1, wherein the autonomous vehicle agent performs at least one second vehicle-based action by selecting at least one second entry for attaining at least one another vehicle-based service.

3. The system of claim 1, wherein the autonomous vehicle agent comprises a digital identity which is a digital representation of an identity of the first user, and wherein the system is configured to allow data communication between the autonomous vehicle agent and the digital representation upon verification of the digital identity of the autonomous vehicle agent by the digital representation.

4. The system of claim 1, wherein the system is configured to allow data communication between the autonomous vehicle agent and the autonomous service agent upon mutual verification of the digital identities of the autonomous vehicle agent and the autonomous service agent.

5. The system of claim 1, wherein a given autonomous agent is built using information pertaining to a given user, such information being at least one of information mined from social media networks, information collected via a form, and information mined from a user device.

6. A method for providing at least one vehicle-based service, the method comprising:

building a decentralized network comprising a plurality of nodes storing a plurality of entries corresponding to a plurality of vehicle-based services;

building an autonomous vehicle agent, wherein the autonomous vehicle agent is a software module that is a digital twin of a first user seeking the at least one vehicle-based service, the digital twin being generated from first-user data obtained, upon authorization, from at least one user-associated device, the user-associated device comprising at least one of: a user device, a camera, and a global positioning system;

building an autonomous service agent, wherein the autonomous service agent comprises a software module that is a digital twin of a unique identity of a second user providing the at least one vehicle-based service, the digital twin being generated from service-provider data of the second user stored in a plurality of entries corresponding to a plurality of vehicle-based services, wherein the autonomous vehicle agent, the autonomous service agent, and a plurality of users comprising a plurality of first users and a plurality of second user are connected via the decentralized network;

wherein the autonomous vehicle agent comprises at least one hardware processing module operatively coupled to the decentralized network and to the at least one user-associated device, wherein the method further comprises executing, by the at least one hardware processing module, the steps of:

identifying, using a machine-learning mining algorithm, the first-user data from the at least one user-associated device, wherein the first-user data comprises at least one of: a present location, recurrent locations, a preference, a requirement, and a like or dislike;

executing a data-processing algorithm to extract service parameters of the at least one vehicle-based service from the first-user data, the service parameters comprising at least a service type and a service location, the service location being identifiable from at least one of: the camera and the global positioning system;

executing a search algorithm, a search over the decentralized network to identify the plurality of entries that correspond to the service parameters;

comparing the identified plurality of entries corresponding to the service parameters using one or more decision factors of the at least one vehicle-based service for the first user, the one or more decision factors comprising at least one of: cost, accessibility, distance, and historical quality;

selecting at least one first entry from the identified plurality of entries that satisfies the one or more decision factors, transmitting, over the decentralized network, data corresponding to the selected first entry to the autonomous service agent, the transmitted data being operative to initiate execution of at least one service-based action by the autonomous service agent; and transmitting, over the decentralized network, data comprising control instructions corresponding to the selected first entry, the control instructions being executable by the autonomous vehicle agent to perform at least one vehicle-based action comprising at least one of: transmitting vehicle-location data and unlocking the vehicle.

7. The method of claim 6, wherein the method further comprises performing at least one second vehicle-based action by selecting at least one second entry for attaining at least one another vehicle-based service.

8. The method of claim 6, wherein the autonomous vehicle agent comprises a digital identity which is a digital representation of an identity of the first user, and wherein the method further comprises allowing data communication between the autonomous vehicle agent and the digital representation upon verification of the digital identity of the autonomous vehicle agent by the digital representation.

9. The method of claim 6, wherein the method further comprises allowing communication between the autonomous vehicle agent and the autonomous service agent upon mutual verification of the digital identities of the autonomous vehicle agent and the autonomous service agent.

10. The method of claim 6, wherein when building a given autonomous agent, the method comprises using information pertaining to a given user, such information being at least one of information mined from social media networks, information collected via a form, and information mined from a user device.

11. The method of claim 6, wherein information is collected and shared between the plurality of autonomous agents through the decentralized network.

12. The system of claim 1, wherein the at least one vehicle-based service is booking a parking space, and wherein to avail the parking space booking facility, the autonomous vehicle agent is configured to perform the at least one vehicle-based action including:

employ one or more street cameras to identify available parking spaces in proximity of a location the first user is travelling to, wherein the availability of parking spaces is determined based on real-time location and road circumstance data received from at least one of: the camera and the global positioning system; and book one of the available parking spaces for a vehicle of the first user using a haptic user authorization, wherein the haptic user authorization is performed by the first user touching a portion of a vehicle mirror to authorize the booking.

13. The system of claim 1, wherein the at least one vehicle-based service is a vehicle transportation facility for transporting a vehicle of the first user, wherein to avail the vehicle transporting facility, the autonomous vehicle agent is configured to perform the at least one vehicle-based action including:

identify current geographical location of the vehicle from a global positioning system (GPS) of the vehicle;

book a transportation facility and share the current geographical location of the vehicle to a towing truck; and track the towing truck to transport the vehicle from the current geographical location to a destination.

14. The system of claim 1, wherein the at least one vehicle-based service is a vehicle re-fueling facility for refueling a vehicle of the first user while being parked, wherein to avail the re-fueling facility, the autonomous vehicle agent is configured to perform the at least one vehicle-based action including:

book a vehicle re-fueling service for the vehicle of the first user; and autonomously unlock a lid of a fuel tank of the vehicle when a re-fueling truck arrives.

15. The system of claim 1, wherein the at least one vehicle-based service is a delivery facility to a vehicle of the first user while being parked, wherein to avail the delivery facility, the autonomous vehicle agent is configured to perform the at least one vehicle-based action including:

book a delivery to the vehicle;

share a location of the vehicle with the autonomous service agent, wherein the autonomous service agent dispatches a delivery agent to deliver deliverables to the vehicle; and autonomously unlock the vehicle to allow the delivery agent to place the deliverables in the vehicle.

16. The system of claim 1, wherein the at least one vehicle-based service is a vehicle servicing facility, wherein to avail the vehicle servicing facility, the autonomous vehicle agent is configured to perform the at least one vehicle-based action including:

book a service appointment for a vehicle of the first user;

share a location of the vehicle with a mechanic; and autonomously unlock the vehicle to allow access to the mechanic for servicing the vehicle.

17. The system of claim 1, wherein the at least one vehicle-based service is a vehicle cleaning facility, wherein to avail the vehicle cleaning facility, the autonomous vehicle agent is configured to perform the at least one vehicle-based action including:

book a vehicle cleaning appointment for a vehicle of the first user;

share a location of the vehicle with a vehicle cleaner; and autonomously unlock the vehicle to allow access to the vehicle cleaner for cleaning the vehicle.

18. The system of claim 1, wherein the at least one data processing algorithm comprises at least one of: a random walk algorithm, a distributed hash table algorithm, a streaming algorithm, a bulk synchronous processing (BSP) algorithm, and a MapReduce algorithm.

19. The system of claim 1, wherein the searching algorithm comprises at least one of: a linear search algorithm, a binary search algorithm, a jump search algorithm, an interpolation search algorithm, an exponential search algorithm, a sub-list search algorithm, a fibonacci search algorithm, and a ubiquitous binary search algorithm.

* * * * *